Oct. 5, 1926.

A. SICO

MILK BOTTLE PROTECTOR

Filed April 3, 1925

1,601,888

Inventor
Americo Sico

Patented Oct. 5, 1926.

1,601,888

UNITED STATES PATENT OFFICE.

AMERICO SICO, OF BOSTON, MASSACHUSETTS.

MILK-BOTTLE PROTECTOR.

Application filed April 3, 1925. Serial No. 20,463.

This invention relates to an improved bottle protector and it has specific reference to a protector which is especially, but not necessarily, designed for use, in association with a baby's milk bottle.

The principal object is to provide a removable elastic casing for the bottle, which is shaped to conform thereto, and is adapted to fit snugly thereon, the casing being provided with circumferentially spaced ribs or fins, such as will protect the bottle against breakage, in case it is dropped from an elevation, onto the floor.

More specifically, the invention relates to a protector casing, which is made up of substantially duplicate sections, which are detachably connected together end to end, to facilitate application and removal there being fins carried by each section, and these fins being reinforced by interposed connecting webs.

It is also a feature of the invention to provide a casing, fitting snugly upon the bottle, and functioning additionally as an insulator, to keep the contents of the bottle warm for a comparatively long period of time, this casing being provided with a row of sight openings, enabling the contents of the bottle to be viewed, to ascertain the level.

Other features and advantages of the invention will become apparent from the following description and drawing.

In the accompanying drawings, forming a part of this application, and in which like numerals are employed to designate like parts throughout the same:—

Figures 1, 2, 3:
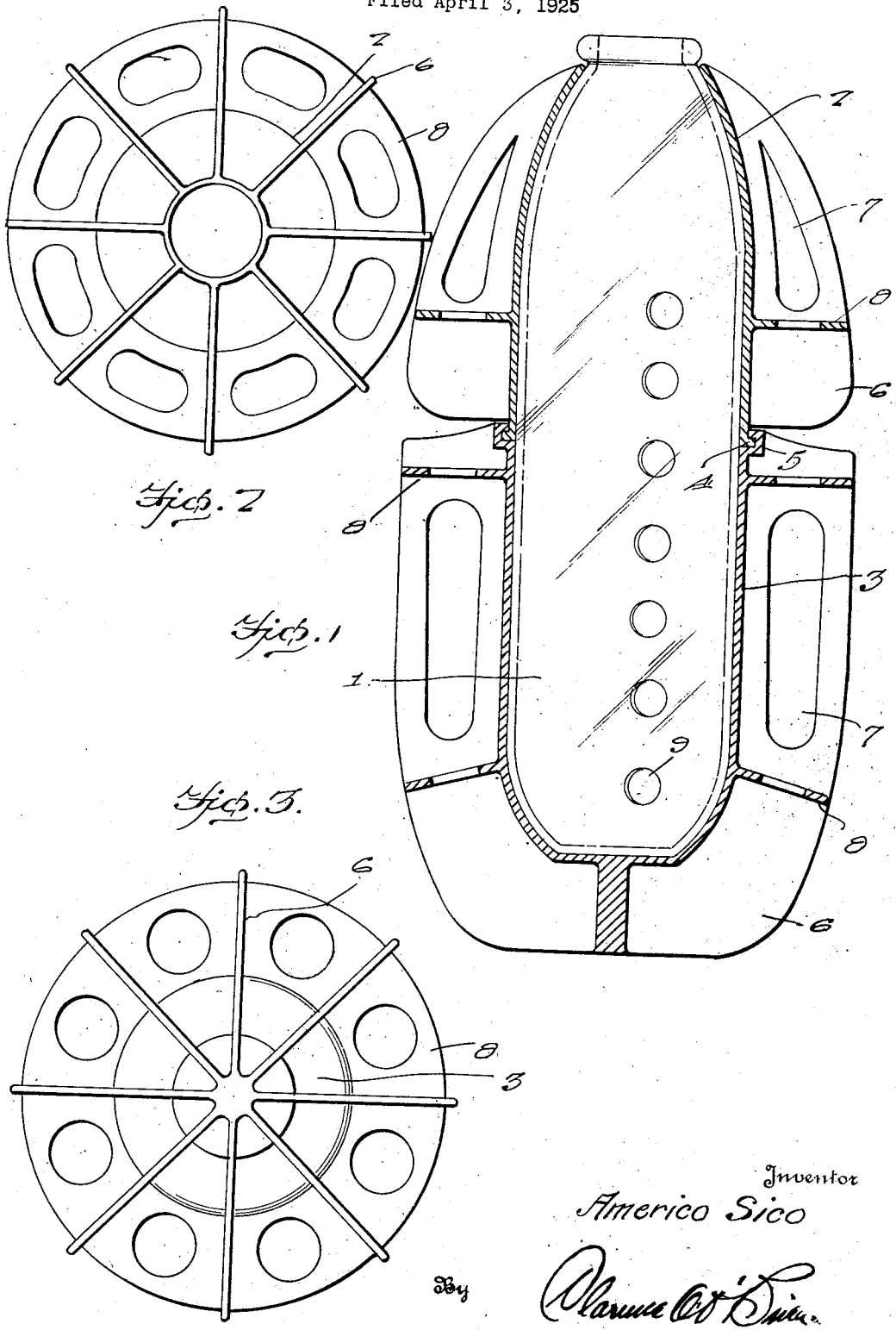
Figure 1 is a longitudinal section through a milk bottle and protector therefor, the protector being constructed strictly in accordance with the present invention.
Figure 2 is a top plan view.
Figure 3 is a bottom plan view.

In the drawings, the reference character 1 designates an elongated milk bottle, such as is used for feeding small babies. The bottle shown is substantially ovate in longitudinal section and circular cross section, but it may vary in configuration, and accordingly, the improved protector casing will be shaped to correspond to the shape thereof. As before intimated, the improved device comprises a casing into which the bottle is fitted, the casing being of elastic rubber and clinging snugly to the outer surface of the bottle. The casing is preferably made up of half sections 2 and 3, the upper section 2 being provided on its inner end with a lateral flange 4 and the adjacent end of the lower section 3 being formed with a channel 5, to which the flange is extended, to provide a separable joint between the sections. The section 2 is open at its top to surround the bottle below its bead and to afford room for connection of the usual nipple. Both of the sections are provided with longitudinally extending circumferentially spaced ribs 6, all of which converge toward the opposite ends of the bottle. These ribs are provided with elongated openings 7 of suitable shape, to decrease the weight and to add to the flexibility of the ribs. By employing various shapes of openings for the ribs, the device may be made quite ornamental. To prevent undue flexibility of the ribs or fins, flexible apertured webs 8 are interposed therebetween and connected therewith as shown more plainly in the plan view. As before stated, the casing literally hugs the surface of the bottle, and serves as an insulator for maintaining the contents of the bottle warm for a longer period of time than would otherwise be the case. In order to permit the contents of the body to be reviewed, however, to ascertain the level, the casing is provided with a row or other suitably arranged openings 9, which may be referred to as sight openings.

From the foregoing description and drawings, it will be evident that I have evolved and produced an exceedingly simple and inexpensive elastic casing for a child's milk bottle, the same being made up of sections to facilitate application and removal, and cleaning of the bottle and being provided with flexible ribs, which serve as shock absorbers in the event that the bottle is dropped on the floor. Consequently, the bottle cannot be broken, even if violently thrown down by the child. Thus, the practicability and advantage of this casing is quite apparent. It is thought that persons familiar with articles of this type will be able to obtain a clear understanding of the invention from the description and drawing, and for this reason a more lengthy description is thought unnecessary.

While the preferred embodiment of the invention has been shown and described, and while it has been intimated that the device is restricted for use upon babies' milk bottles, it is to be understood that it may well serve as a protector for other fragile containers of this class, by varying the shape of the casing. Furthermore other minor changes coming within the field of the invention claimed, may be resorted to, if desired.

I claim:—

1. As a new article of manufacture, a bottle protector comprising an elastic casing shaped to fit upon and contain a bottle and insulate the contents thereof, longitudinal spaced fins carried by said casing and extending radially therefrom, and spaced webs interposed between and joining said fins; the said fins and webs being elastic whereby they are possessed of cushioning capacity.

2. As a new article of manufacture, a bottle protector comprising an elastic casing shaped to fit upon and contain a bottle and insulate the contents thereof, longitudinal spaced fins carried by said casing and extending radially therefrom, and spaced webs interposed between and joining said fins; the said fins and webs being elastic whereby they are possessed of cushioning capacity, and the said casing being in sections detachably connected together of themselves in end to end relation.

In testimony whereof I affix my signature.

AMERICO SICO.